(12) United States Patent
Tay et al.

(10) Patent No.: US 8,983,003 B2
(45) Date of Patent: Mar. 17, 2015

(54) METHOD AND SYSTEM FOR ADAPTIVELY IDENTIFYING SIGNAL BANDWIDTH

(75) Inventors: Wan fook Tay, Shenzhen (CN); Xiongbiao Jiang, Shenzhen (CN); Ruihua Yin, Shenzhen (CN); Bingyan Yu, Shenzhen (CN)

(73) Assignee: Hytera Communications Corp., Ltd., Shenzhen, Guangdong (CN)

( * ) Notice: Subject to any disclaimer, the term of this patent is extended or adjusted under 35 U.S.C. 154(b) by 178 days.

(21) Appl. No.: 13/637,956

(22) PCT Filed: Mar. 31, 2010

(86) PCT No.: PCT/CN2010/071480
§ 371 (c)(1),
(2), (4) Date: Sep. 27, 2012

(87) PCT Pub. No.: WO2011/120226
PCT Pub. Date: Oct. 6, 2011

(65) Prior Publication Data
US 2013/0028308 A1    Jan. 31, 2013

(51) Int. Cl.
*H03K 9/06* (2006.01)
*H03D 3/00* (2006.01)
*H04L 27/00* (2006.01)
*H04L 27/38* (2006.01)

(52) U.S. Cl.
CPC ............ *H04L 27/0006* (2013.01); *H04L 27/38* (2013.01)
USPC ............ 375/322; 375/316; 375/324; 375/340

(58) Field of Classification Search
USPC .................................. 375/316, 322, 324, 340
See application file for complete search history.

(56) References Cited

U.S. PATENT DOCUMENTS

| 5,402,449 A |   | 3/1995  | Schultes et al. |
|---|---|---|---|
| 5,694,417 A | * | 12/1997 | Andren et al. ................ 375/150 |
| 5,712,870 A | * | 1/1998  | Petrick .......................... 375/147 |
| 6,178,211 B1 |  | 1/2001  | Whikehart et al. |

(Continued)

FOREIGN PATENT DOCUMENTS

| CN | 1249865 A | 4/2000 |
|---|---|---|
| CN | 1711719 A | 12/2005 |

(Continued)

OTHER PUBLICATIONS

International Search Report dated Jan. 6, 2011 from corresponding International Application No. PCT/CN2010/071480.
Extended European Search Report dated Jul. 23, 2013 from corresponding European Application No. 10848687.

*Primary Examiner* — Ted Wang
(74) *Attorney, Agent, or Firm* — Wolf, Greenfield & Sacks, P.C.

(57) ABSTRACT

The present invention discloses a method and system for adaptively identifying signal bandwidth. The method includes: performing digitizing intermediate frequency processing to the received signal and outputting in-phase/quadrature (I/Q) signals; identifying signal bandwidth of the I/Q signals according to at least two signal identification templates and outputting the synchronized signal flows after a successful identification. A system for adaptively identifying signal bandwidth is also disclosed. The present invention can be compatible with at least two bandwidth modes, and the software can automatically perform identification and switch of the modulation bandwidth, when manual invention is not necessary and the operation is simple.

10 Claims, 9 Drawing Sheets

(56) References Cited

U.S. PATENT DOCUMENTS

| | | |
|---|---|---|
| 6,510,313 B1 | 1/2003 | Rapeli |
| 2004/0152434 A1 | 8/2004 | Peterson, III et al. |
| 2008/0051134 A1 | 2/2008 | Brobston et al. |
| 2011/0051705 A1* | 3/2011 | Jones et al. .................. 370/338 |

FOREIGN PATENT DOCUMENTS

| | | |
|---|---|---|
| CN | 101001231 A | 7/2007 |
| CN | 101184255 A | 5/2008 |
| CN | 101562590 A | 10/2009 |
| WO | WO 2008115873 A1 | 9/2008 |

* cited by examiner

METHOD AND SYSTEM FOR ADAPTIVELY IDENTIFYING SIGNAL BANDWIDTH

FIELD OF THE INVENTION

The present invention relates to the communication technology, and in particular to a method and system for adaptively identifying signal bandwidth.

BACKGROUND OF THE INVENTION

Radio-wave spectrum is a kind of limited strategic resource. With the development of wireless communication services, it is an inevitable trend that channel bandwidth of wireless communication will be reduced to meet the requirement of the continuously increasing amount of users. For this reason, the channel bandwidth for wireless radios is necessitated to be transited from 25 kHz to 12.5 kHz or 6.25 kHz. The wireless radio communication outside China is developing toward a 6.25 kHz narrow-band technique, which is the developing direction for the international digital radios.

To popularize the application of the narrow-band digital technique in the market better, European Telecommunications Standards Institute (ETSI), Conference Europe of Post and Telecommunications (CEPT), American Federal Communications Commission (FCC), American Railroads Association, Japanese Association of Radio Industries and Businesses (ARIB) and the like are actively promoting the effective utilization of the spectrum resources and actively supporting manufacturers of radio devices to develop systems and devices with high frequency spectrum utilization efficiency, and great advance has been made. FCC 08-127 specifies that authentication of any devices having the 25 kHz-mode is forbidden from Jan. 1, 2011, and conversion into the 6.25 kHz-mode by the licensee is encouraged.

Presently, in the decision of conferences about the radio spectrum resources made by China radio-wave spectrum planning department, it is mentioned that approbation of analog radio model numbers will be stopped in China. Future digital radios in China have two standards: 12.5 kHz bandwidth standard and 6.25 kHz bandwidth standard.

To smoothly transit between the 12.5 kHz standard and the 6.25 kHz standard so as to make the most of the existing devices and reduce the cost for device replacement, it is necessary to realize free inter-communication between radios with different bandwidths under the same standard.

The existing wireless communication devices such as the radios support the digital or analog 12.5 kHz adaptive identification. Such devices achieve the digital and analog adaptive identification by identifying a synchronization frame.

The inventors discover that the prior art has the following disadvantages:

1) Adaptive identification between different bandwidths is not supported;

2) Adaptive identification between digital modes is not supported;

3) Inter-communication between the 6.25 kHz standard and the 12.5 kHz standard can not be realized in the case of consistent air interface protocols; and 4) A host can support only one standard.

SUMMARY OF THE INVENTION

A technical problem to be solved by the present invention is to provide a method and system for adaptive identification in communication with different bandwidth standard intervals, for avoid the disadvantage that inter-communication can not be achieved between different bandwidth standards in the prior art.

A technical solution adopted by the present invention to solve the technical problem is to propose a method for adaptively identifying a signal bandwidth, and the method includes the following steps:

performing an intermediate frequency digitization process on a received signal and outputting an I/Q signal; and identifying the signal bandwidth of the I/Q signal according to at least two signal identification templates and outputting a synchronized signal flow after a successful identification.

The present invention further proposes a system for adaptively identifying a signal bandwidth, and the system includes:

an intermediate frequency digitization process module adapted for performing an intermediate frequency digitization process on a received signal and outputting an I/Q signal; and a signal bandwidth identification module adapted for identifying the signal bandwidth of the I/Q signal output by the intermediate frequency digitization process module according to at least two signal identification templates and outputting a synchronized signal flow after a successful identification.

By implementing the technical solutions of the present invention, the following advantageous effects can be achieved. With a wireless communication device such as a radio according to the present invention, once a carrier signal with a bandwidth interval is received, the adaptive identification is realized by identifying difference between synchronization frame information of multiple signal bandwidth modes according to multiple signal identification templates, so as to switch to the matched receiving or transmitting mode for end-to-end communication. With the adaptive identification of the bandwidth mode, one device can support at least two standards, and the bandwidth-interval signal type to which the received signal belongs to can be identified automatically. Further, the identification and switch of the radio-frequency modulation bandwidth is performed automatically by software, and switching between receiving modes with different modulation bandwidths needs no manual intervenes, which is simple in operation.

BRIEF DESCRIPTION OF THE DRAWINGS

The present invention will be further described in connection with the drawings and embodiments hereinafter, in which.

DETAILED DESCRIPTION OF THE INVENTION

To make objects, technical solutions and advantages of the invention more clear and easy to be understood, the present invention will be further illustrated in detail in the following in conjunction with the drawings and embodiments. It should be understood that the specific embodiments described in detail here are only used to explain the present invention but not to limit the present invention.

Figure 1:
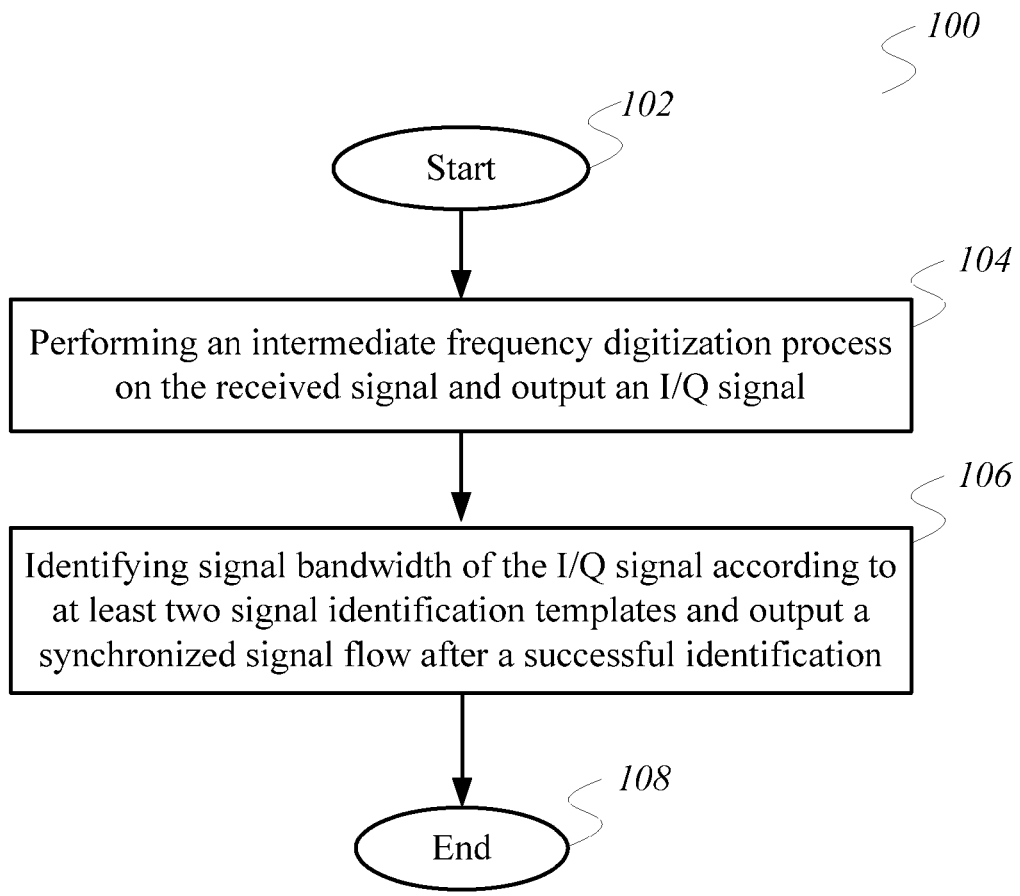
FIG. 1 is a schematic flow chart of a method for adaptively identifying a signal bandwidth according to an embodiment of the present invention.

FIG. 1 is a schematic flow chart of a method for adaptively identifying a signal bandwidth according to an embodiment of the present invention. This method is applicable in a wireless communication device, for example but not limited to a radio. The method 100 starts with the step 102, as shown in FIG. 1.

Then the method proceeds to the step 104 of performing an intermediate frequency digitization process on the received signal and outputting an I/Q (In-phase/Quadrature) signal;

Then the method proceeds to the step 106 of identifying the signal bandwidth of the I/Q signal according to at least two signal identification templates and outputting a synchronized signal flow after a successful identification.

Finally, the method is ended with the step 108.

Generally, a radio frequency signal can be represented by amplitude and phase in the polar coordinate system, or can be represented by a X value and a Y value in the rectangular coordinate system. While in a digital communication system, X is generally substituted by I, indicating in-phase, and Y is generally substituted by Q, indicating 90° phase.

Notes about the reference of "signal identification template": for the process of identifying the bandwidth mode used by the wireless communication device, one bandwidth mode corresponds to one signal identification template. Detailed description is made in the following embodiments.

With the wireless communication device (for example but not limited to the radio) according to the present invention, once a carrier signal with a certain bandwidth interval is received, the adaptive identification is realized by identifying difference between synchronization frame information of multiple signal bandwidth modes according to multiple signal identification templates, so as to switch to the matched receiving or transmitting mode for end-to-end communication. By utilizing multiple signal identification templates, one device can support at least two standards, and the bandwidth-interval signal type to which the received signal belongs to can be identified automatically.

In the step 106, "identifying a signal bandwidth of the I/Q signal according to at least two signal identification templates and outputting a synchronized signal flow after a successful identification" may be implemented in a manner of parallel identification, may be implemented in a manner of serial identification, or may be implemented in a manner combining the parallel identification and the serial identification as needed. The manners of parallel identification and serial identification will be described in detail in connection with examples hereinafter respectively.

Figure 2:
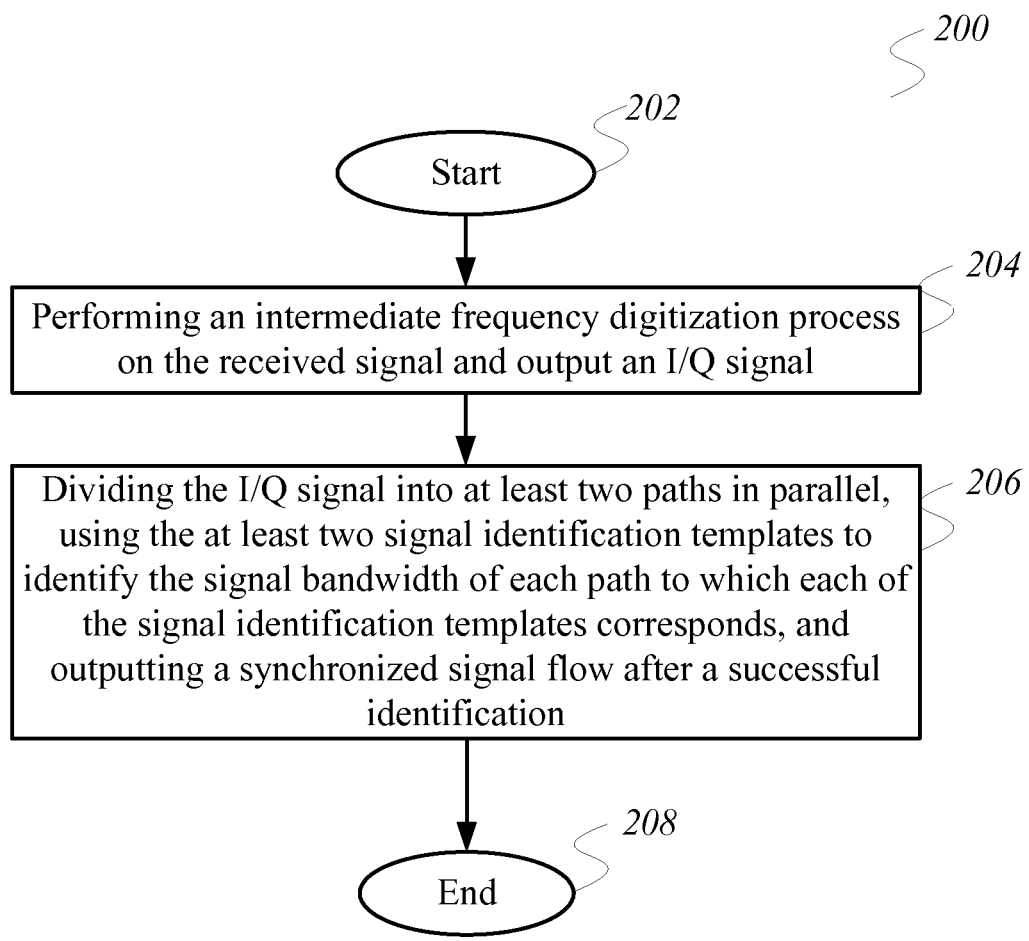
FIG. 2 is a schematic flow chart of a method for adaptively identifying a signal bandwidth in parallel according to an embodiment of the present invention.

FIG. 2 is a schematic flow chart of a method for adaptively identifying a signal bandwidth in parallel according to an embodiment of the present invention. This method is applicable in a wireless communication device, for example but not limited to a radio. The method 200 starts with the step 202, as shown in FIG. 2.

Then the method proceeds to the step 204 of performing an intermediate frequency digitization process on the received signal and outputting an I/Q signal;

Then the method proceeds to the step 206 of dividing the I/Q signal into at least two paths in parallel, using the at least two signal identification templates to identify the signal bandwidth of each path to which each of the signal identification templates corresponds, and outputting a synchronized signal flow after a successful identification.

Finally, the method is ended with the step 208.

The manner of parallel identification shown in FIG. 2 will be described in the following by taking the case of using two signal identification templates as an example (i.e., by taking identification of two signal bandwidths as an example). It should be understood that although the case of using two templates is described here, it is not meant to limit the present invention, and the technical solution of the present invention can also be adapted for identification of three or even more signal bandwidths.

The two signal identification templates are respectively referred to as a first signal identification template and a second signal identification template. The first signal identification template includes a first base-band process and a first adaptive bandwidth identification process; and the second signal identification template includes a second base-band process and a second adaptive bandwidth identification process. The signal bandwidth to be processed by the first signal identification template is for example but not limited to 6.25 kHz, and the signal bandwidth to be processed by the second signal identification template is for example but not limited to 12.5 kHz. For example, the signal bandwidth to be processed may be 25 kHz or other available signal bandwidth standard that will come to use in the future.

The first base-band process includes a first bandwidth filtering process and a first frequency discrimination process, and the second base-band process includes a second bandwidth filtering process and a second frequency discrimination process. Here, the first bandwidth filtering process is 6.25 kHz bandwidth filtering process, and the second bandwidth filtering process is 12.5 kHz bandwidth filtering process. The frequencies to which the first bandwidth filtering process and the second bandwidth filtering process correspond are consistent with those the signal identification templates corresponding to.

The first adaptive bandwidth identification process includes: performing sampling, judging and code symbol forming processes on the signal output by the first base-band process, performing a first symbol mapping process on the output symbol value for outputting a corresponding bit flow, then performing a first frame synchronization process on the bit flow by using frame synchronization information corresponding to bandwidth frequency of 6.25 kHz, and identifying whether the bandwidth frequency of the received signal is 6.25 kHz. Here, the clock frequency for sampling and judging is for example but not limited to a clock frequency that is integral multiple of 2400 bit/s.

The second adaptive bandwidth identification process includes performing sampling, judging and code symbol forming processes on the signal output by the second base-band process, performing a second symbol mapping process on the output symbol value for outputting a corresponding bit flow, then performing a second frame synchronization process on the bit flow by using frame synchronization information corresponding to bandwidth frequency of 12.5 kHz, and identifying whether the bandwidth frequency of the received signal is 12.5 kHz. Here, the clock frequency for sampling and judging is for example but not limited to a clock frequency that is integral multiple of 4800 bit/s.

In the parallel identification, an I/Q signal is output after the intermediate frequency digitization process is performed on the received signal. Here, the intermediate frequency digitization process generally includes analog to digital (A/D) conversion, digital down-conversion, sampling and filtering. The output I/Q signal is divided into two paths in parallel. For one of the two paths, the first base-band process and the first adaptive bandwidth identification process are sequentially performed on the I/Q signal according to the first signal identification template, for identifying whether the signal bandwidth of the I/Q signal is 6.25 kHz. If the signal bandwidth is 6.25 kHz, then the synchronization is realized after the first adaptive bandwidth identification process, and thus an synchronized signal flow is output. Meanwhile, for the other path, the second base-band process and the second adaptive bandwidth identification process are sequentially performed on the I/Q signal according to the second signal identification template, for identifying whether the signal bandwidth of the I/Q signal is 12.5 kHz. If the signal bandwidth is 12.5 kHz, then the synchronization is realized after the second adaptive bandwidth identification process, and thus an synchronized signal flow is output. If the received signal is a signal with the frequency of 6.25 kHz or 12.5 kHz, then synchronization may be realized in one of the two paths and may not be realized in the other path. After the synchronization, parallel process will be stopped; the synchronized path will be directly processed, and the unsynchronized path will be automatically disconnected. Provided that the synchronized signal is the 6.25 kHz channel-interval signal, the 12.5 kHz path will be automatically disconnected, while channel decoding process and the information source decoding process are performed on the synchronized path to output the audio, video or data signal.

If the frequency of the received signal is neither 6.25 kHz nor 12.5 kHz, then synchronization can not be realized in neither of the two paths. Such problem can be solved by introducing additional signal identification templates. Presently, there are only three signal frequency standards, i.e., 6.25 kHz, 12.5 kHz, and 25 kHz. Since the commonly-used signal frequencies are 6.25 kHz and 12.5 kHz, it is adequate to identify the received signal by using the two signal identification templates.

This solution is a portion of the processes for the received signal in communication, for realizing automatic identification and automatic process on the modulation bandwidth of the received signal. A/D conversion and digitization process are performed on the received radio frequency signal or intermediate frequency signal, then the signal is respectively transmitted to two independent 6.25 kHz and 12.5 kHz demodulation units for demodulation, and finally the proper demodulated signal is automatically selected for outputting.

With the wireless communication device such as the radio according to the present invention, once the same carrier signal with a channel-interval having a bandwidth of 6.25 kHz or 12.5 kHz is received, the adaptive identification is realized by identifying difference between synchronization frame information in two modes, so as to switch to the matched receiving or transmitting mode for end-to-end communication. With the adaptive identification of the bandwidth mode, the device can support two standards and be compatible with two bandwidth modes. It may be automatically identified whether the signal is a 6.25 kHz channel-interval signal or a 12.5 kHz channel-interval signal. Further, the identification and switch of the radio frequency modulation bandwidth is performed automatically by software, and switching between receiving modes with different modulation bandwidths needs no manual intervenes, which is simple in operation.

Figure 3:
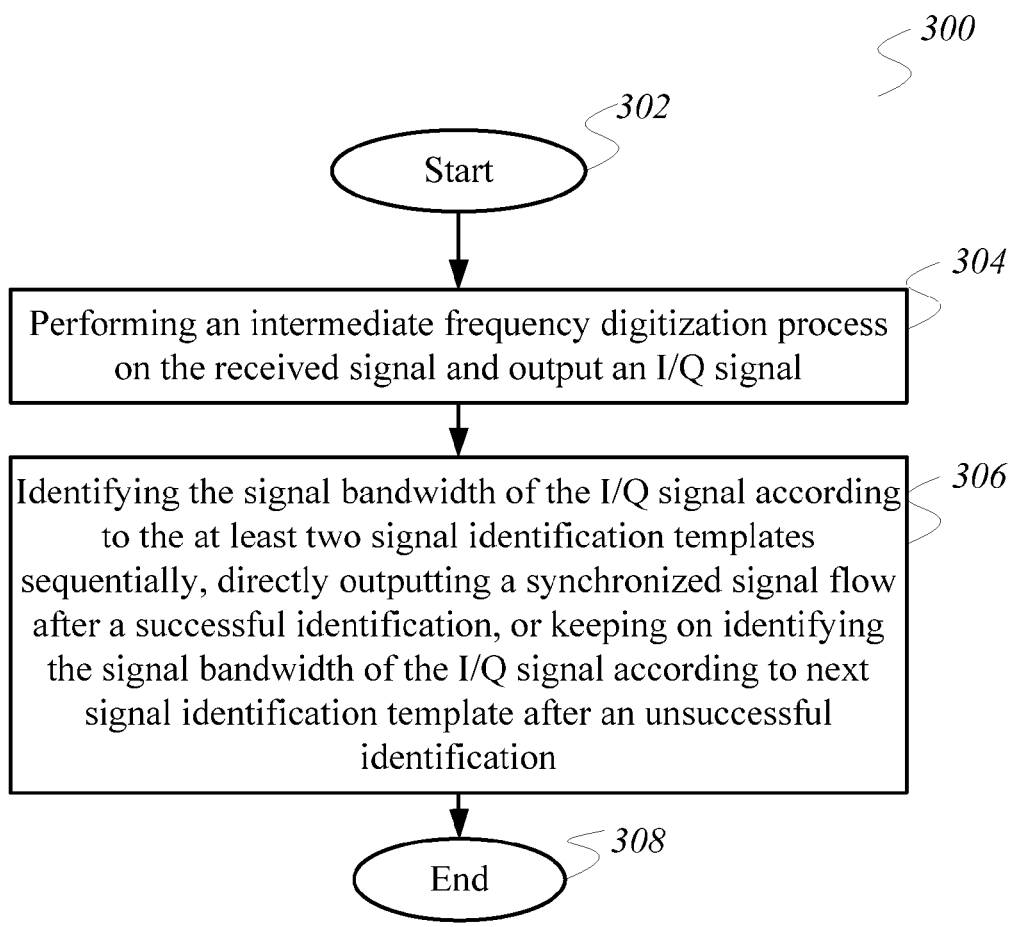
FIG. 3 is a schematic flow chart of a method for adaptively identifying a signal bandwidth in serial according to an embodiment of the present invention.

FIG. 3 is a schematic flow chart of a method for adaptively identifying a signal bandwidth in serial according to an embodiment of the present invention. This method can be applied in the wireless communication device, for example but not limited to a radio. The method 300 starts with the step 302, as shown in FIG. 3.

Then the method proceeds to the step 304 of performing an intermediate frequency digitization process on the received signal and outputting an I/Q signal;

Then the method proceeds to the step 306 of identifying the signal bandwidth of the I/Q signal according to the at least two signal identification templates sequentially, directly outputting a synchronized signal flow after a successful identification, or keeping on identifying the signal bandwidth of the I/Q signal according to next signal identification template after an unsuccessful identification.

Finally, the method is ended with the step 308.

The manner of serial identification shown in FIG. 3 will be described in the following by taking the case of using two signal identification templates as an example (i.e., by taking identification of two signal bandwidths as an example). It should be understood that although the case of using two templates is described here, it is not meant to limit the present invention, and the technical solution of the present invention can also be adapted for identification of three or even more signal bandwidths.

The two signal identification templates are respectively referred to as a first signal identification template and a second signal identification template. The first signal identification template includes a first base-band process and a first adaptive bandwidth identification process; and the second signal identification template includes a second base-band process and a second adaptive bandwidth identification process. The signal bandwidth to be processed by the first signal identification template is for example but not limited to 6.25 kHz, and the signal bandwidth to be processed by the second signal identification template is for example but not limited to 12.5 kHz. For example, the signal bandwidth to be processed may be 25 kHz or other available signal bandwidth standard that will come to use in the future.

The first base-band process includes a first bandwidth filtering process and a first frequency discrimination process, and the second base-band process includes a second bandwidth filtering process and a second frequency discrimination process. Here, the first bandwidth filtering process is 6.25 kHz bandwidth filtering process, and the second bandwidth filtering process is 12.5 kHz bandwidth filtering process. The frequencies to which the first bandwidth filtering process and the second bandwidth filtering process correspond are consistent with those the signal identification templates corresponding to.

The first adaptive bandwidth identification process includes: performing sampling, judging and code symbol forming processes on the signal output by the first base-band process, performing a first symbol mapping process on the output symbol value for outputting a corresponding bit flow, then performing a first frame synchronization process on the bit flow by using frame synchronization information corresponding to bandwidth frequency of 6.25 kHz, and identifying whether the bandwidth frequency of the received signal is 6.25 kHz.

The second adaptive bandwidth identification process includes performing sampling, judging and code symbol forming processes on the signal output by the second base-band process, performing a second symbol mapping process on the output symbol value for outputting a corresponding bit flow, then performing a second frame synchronization process on the bit flow by using frame synchronization information corresponding to bandwidth frequency of 12.5 kHz, and identifying whether the bandwidth frequency of the received signal is 12.5 kHz.

In the serial identification, an I/Q signal is output after the intermediate frequency digitization process is performed on the received signal. Here, the intermediate frequency digitization process generally includes analog to digital (A/D) conversion, digital down-conversion, sampling and filtering. For the output I/Q signal, the first base-band process and the first adaptive bandwidth identification process are sequentially performed according to the first signal identification template, for identifying whether the signal bandwidth of the I/Q signal is 6.25 kHz. If the signal bandwidth is 6.25 kHz, then the synchronization will be realized after the first adaptive bandwidth identification process, and thus an synchronized signal flow is output. There is no need to process according to the second signal identification template, i.e., the subsequent process according to the other signal identification templates is terminated after the synchronization is realized.

If the synchronization is not realized by using the first signal identification template, i.e., the bandwidth frequency of the received signal is not 6.25 kHz, then the following processes will be continuously performed sequentially: the second base-band process and the second adaptive bandwidth identification process are sequentially performed according to the second signal identification template, for identifying whether the signal bandwidth of the I/Q signal is 12.5 kHz. If the signal bandwidth is 12.5 kHz, then the synchronization will be realized after the second adaptive bandwidth identification process, and thus an synchronized signal flow is output. Such method can also be adapted for three or more signal identification templates. If the synchronization is not realized by using the second signal identification template, i.e., the bandwidth frequency of the received signal is neither 6.25 kHz nor 12.5 kHz, then the process will be performed by using the third signal identification template, until the synchronization is realized. Presently, there are only three signal frequency standards, i.e., 6.25 kHz, 12.5 kHz, and 25 kHz. Since the commonly-used signal frequencies are 6.25 kHz and 12.5 kHz, it is adequate to identify the received signal by using the two signal identification templates.

In the embodiments shown in FIGS. 2 and 3, before the frame synchronization, bit synchronization process can also be performed, but the bit synchronization is optional and can be performed as needed for the identification. The first adaptive bandwidth identification process and the second adaptive bandwidth identification process are not limited to the above mentioned operations of sampling and judging, symbol mapping, bit synchronization, and frame synchronization, and other operations that can realize the base-band decoding also fall in the scope of protection of the present invention.

Figure 4:
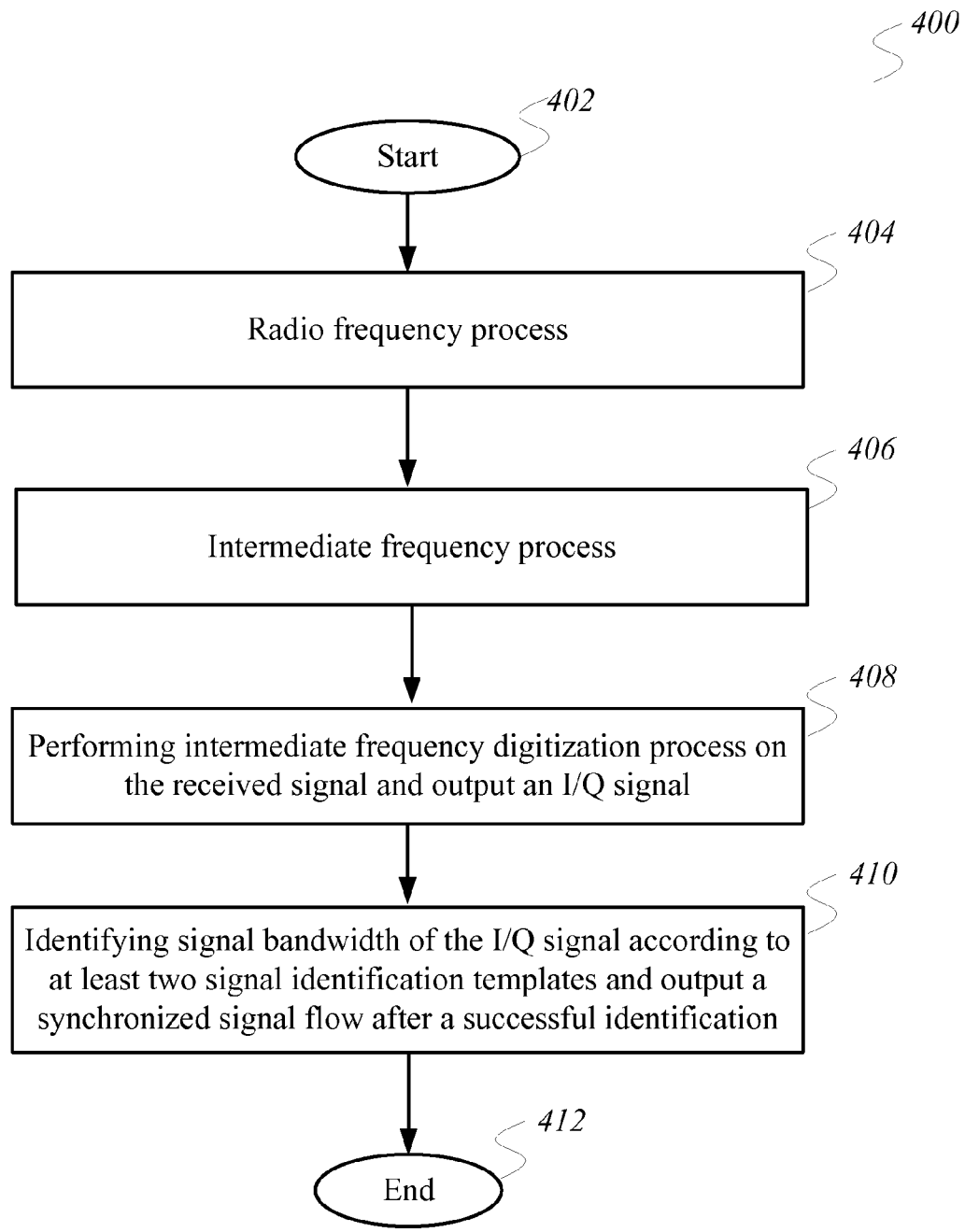
FIG. 4 is a schematic flow chart of a method for adaptively identifying a signal bandwidth according to another embodiment of the present invention.

FIG. 4 is a schematic flow chart of a method for adaptively identifying a signal bandwidth according to another embodiment of the present invention. Before the intermediate frequency digitization process, intermediate frequency (referred to as IF for short) process will be performed on the received signal, no matter in the parallel identification or in the serial identification. Further, if the received signal is a radio frequency (referred to as RF for short) signal, then a radio frequency process needs to be performed before the intermediate frequency process.

As shown in FIG. 4, the method 400 starts with the step 402.

Then in the step 404, a radio frequency process is performed on the received signal. Generally, the radio frequency process includes amplifying process for high frequency weak signal and band-pass filtering (referred to as BPF for short) process. The radio frequency process is optional, depending on the type of the signal, referring to the structural diagram of the circuit shown in FIG. 5 for detail.

Then in the step 406, an intermediate frequency process is performed on the radio frequency processed signal. The intermediate frequency process generally includes frequency mixing process, BPF and intermediate frequency amplifying process.

Then steps 408 and 410 are performed, which are the same as the steps 104 and 106 shown in FIG. 1 and will not be described in detail here.

Finally, the method 400 is ended with the step 412.

It can be understood that in the radio frequency process, before the amplifying process for high frequency weak signal, the low-pass filtering (LPF) process and the BPF process are performed at first, then the following stage BPF process is performed for restraining the out-of-band noise. Then the radio frequency automatic gain control (RF AGC) process is performed. Practically, there can be other manners or order for the processes, and the present invention is not so limited. Similarly, in the intermediate frequency process, an intermediate frequency automatic gain control (IF AGC) process can be added to follow the intermediate frequency amplification process. Of course, there can be other manners or order for the processes, and the present invention is not so limited. The details of the radio frequency and intermediate frequency processes can be seen in FIG. 5.

Figure 5:
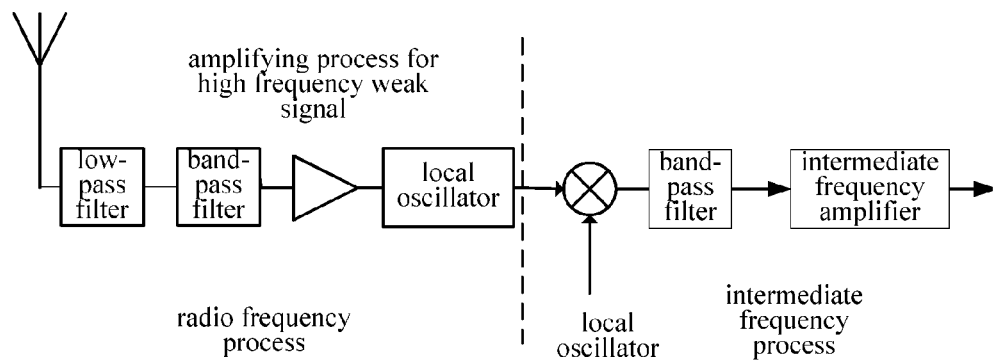
FIG. 5 is a circuit diagram for the intermediate frequency process and the radio frequency process shown in FIG. 4.

FIG. 5 is a circuit diagram for the intermediate frequency process and radio frequency process shown in FIG. 4. The signal, which is received via a receiving antenna, may be with a bandwidth of 6.25 kHz or 12.5 kHz. If the received signal is a RF signal, then the RF process must be performed at first, in which the received signal is passed through the low-pass filtering (LPF) process and the band-pass filtering (BPF) process for removing the out-of-band signal, passed through the amplifying process for high frequency weak signal (or LNA), transmitted to the BPF, and then transmitted to the intermediate frequency process. Before the intermediate frequency process, a RF AGC process (not shown in the Figure) can also be added. In the intermediate frequency process, by a local oscillator, the frequency mixing process is performed on the signal that is output after the RF process, and then the signal is transmitted to the BPF, for performing the band-pass filtering process and the intermediate frequency amplifying (IF AMP) process. After the IF AMP, the IF AGC process (not shown in the Figure) can also be performed. Practically, there can also be other manners or orders for the processes, and the present invention is not so limited.

Figure 6:
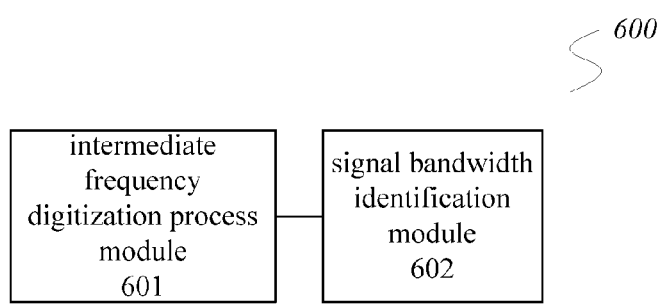
FIG. 6 is a schematic structural diagram of a system for adaptively identifying a signal bandwidth according to an embodiment of the present invention.

FIG. 6 is a schematic structural diagram of a system for adaptively identifying a signal bandwidth according to an embodiment of the present invention. As shown in FIG. 6, the system 600 for adaptively identifying a signal bandwidth includes an intermediate frequency digitization process module 601 and a signal bandwidth identification module 602.

The intermediate frequency digitization process module 601 is adapted for performing an intermediate frequency digitization process on a received signal and outputting an I/Q signal The signal bandwidth identification module 602 is adapted for identifying the signal bandwidth of the I/Q signal, which is output from the intermediate frequency digitization process module, according to at least two signal identification templates, and outputting a synchronized signal flow after a successful identification.

The system 600 for adaptively identifying a signal bandwidth shown in FIG. 6 can be adapted for serial identification and can also be adapted for parallel identification. In the parallel identification process, the signal bandwidth identification module 602 is adapted for dividing the I/Q signal into at least two paths in parallel, using the at least two signal identification templates to identify the signal bandwidth of each path to which each of the signal identification templates corresponds, and outputting a synchronized signal flow after a successful identification. In the serial identification process, the signal bandwidth identification module 602 is adapted for identifying the signal bandwidth of the I/Q signal according to at least two signal identification templates sequentially, outputting a synchronized signal flow after a successful identification, or keeping on identifying the signal bandwidth of the I/Q signal according to next signal identification template after a unsuccessful identification.

Figure 7:
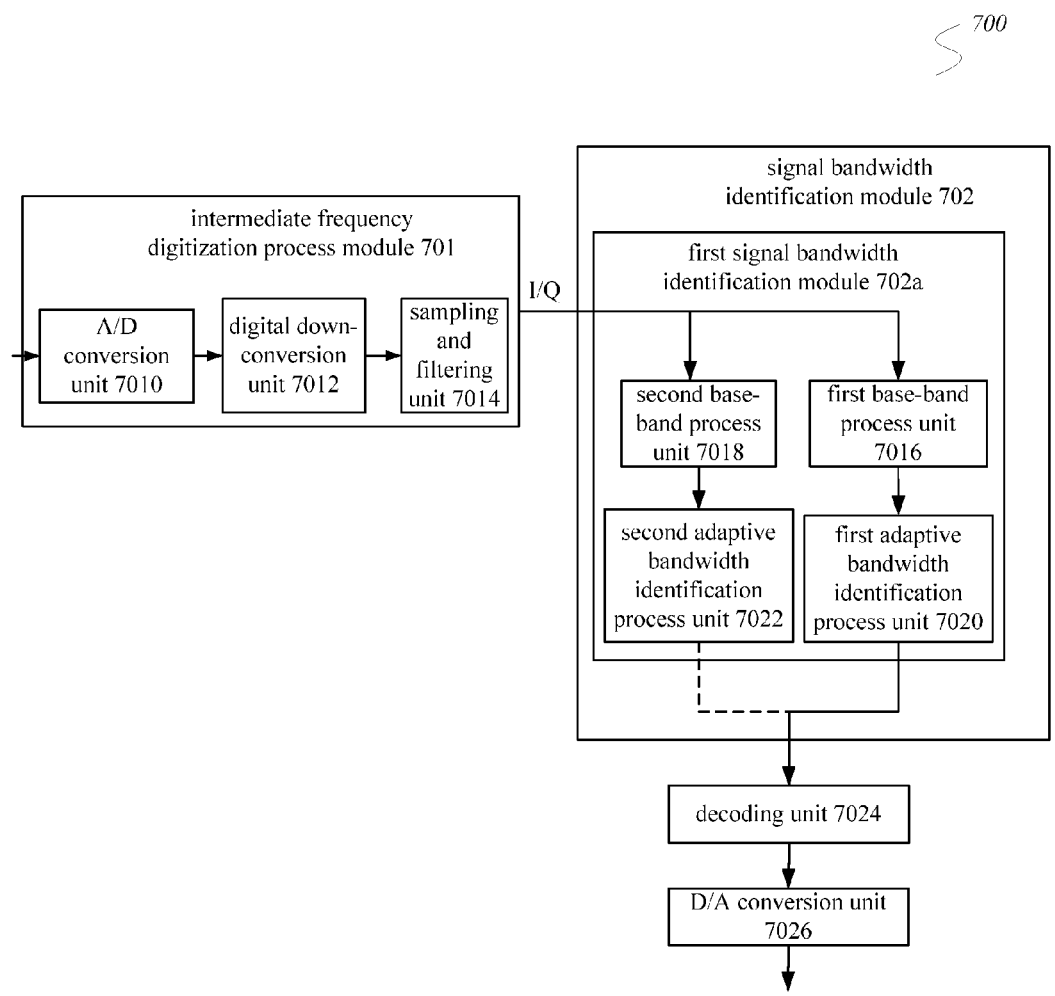
FIG. 7 is a schematic structural diagram of a system for adaptively identifying a signal bandwidth in which the identification is performed in parallel by using two signal templates.

FIG. 7 shows the parallel identification process of FIG. 6 by taking the case of using two signal identification templates (i.e., identifying two signal bandwidths) as an example. It should be understood that although the case of using two templates is described here, it is not meant to limit the present invention, and the technical solution of the present invention can also be adapted for identification of three or even more signal bandwidths.

The two signal identification templates are respectively referred to as a first signal identification template and a second signal identification template. The first signal identification template includes a first base-band process and a first adaptive bandwidth identification process; and the second signal identification template includes a second base-band process and a second adaptive bandwidth identification process. The signal bandwidth to be processed by the first signal identification template is for example but not limited to 6.25 kHz, and the signal bandwidth to be processed by the second signal identification template is for example but not limited to 12.5 kHz. For example, the signal bandwidth to be processed may be 25 kHz or other available signal bandwidth standard that will come to use in the future. The first base-band process includes a first bandwidth filtering process and a first frequency discrimination process, and the second base-band process includes a second bandwidth filtering process and a second frequency discrimination process. Here, the first bandwidth filtering process is 6.25 kHz bandwidth filtering process, and the second bandwidth filtering process is 12.5 kHz bandwidth filtering process. The frequencies to which the first bandwidth filtering process and the second bandwidth filtering process correspond are consistent with those the signal identification templates corresponding to.

The system 600 for adaptively identifying a signal bandwidth shown in FIG. 7 includes an intermediate frequency digitization process module 701 and a signal bandwidth identification module 702.

The intermediate frequency digitization process module 701 includes an A/D conversion unit 7010, a digital down-conversion process unit 7012, and a sampling and filtering unit 7014. The signal bandwidth identification module 702 includes a first signal bandwidth identification module 702*a*, and the first signal bandwidth identification module 702*a* includes a first base-band process unit 7016, a second base-band process unit 7018, a first adaptive bandwidth identification process unit 7020 and a second adaptive bandwidth identification process unit 7022.

The intermediate frequency digitization process module 701 is adapted for performing A/D conversion and digital down-conversion on the received signal, outputting an I/Q signal by sampling and filtering the output intermediate frequency signal (such as the zero intermediate frequency signal). The I/Q signal is divided into two paths to be send to the first base-band process unit 7016 and the second base-band process unit 7018 for the first base-band process and the second base-band process. The first base-band process unit 7016 is adapted for performing the first base-band process on one path of the I/Q signal, to which the first base-band process unit 7016 corresponds, according to the first signal identification template, and the first adaptive bandwidth identification process unit 7020 is adapted for performing the first adaptive bandwidth identification process on the path of I/Q signal, to which the first adaptive bandwidth identification process unit 7020 corresponds, according to the first signal identification template, for identifying the signal bandwidth of the I/Q signal; the second base-band process unit 7018 is adapted for performing the second base-band process on the other path of I/Q signal, to which the second base-band process unit 7018 corresponds, according to the second signal identification template, and the second adaptive bandwidth identification process unit 7022 is adapted for performing the second adaptive bandwidth identification process on the other path of I/Q signal, to which the second adaptive bandwidth identification process unit 7022 corresponds, according to the second signal identification template, for identifying the signal bandwidth of the I/Q signal. The first adaptive bandwidth identification process unit 7020 is adapted for performing sampling, judging and code symbol forming processes on the signal output by the first base-band process unit 7016, performing a first symbol mapping process on the output symbol value for outputting a corresponding bit flow, then performing a first frame synchronization process on the bit flow by using frame synchronization information corresponding to the bandwidth frequency of 6.25 kHz, and identifying whether the bandwidth frequency of the received signal is 6.25 kHz.

The second adaptive bandwidth identification process unit 7022 is adapted for performing sampling, judging and code symbol forming processes on the signal output by the second base-band process unit 7018, performing a second symbol mapping process on the output symbol value for outputting a corresponding bit flow, then performing a second frame synchronization process on the bit flow by using frame synchronization information corresponding to the bandwidth frequency of 12.5 kHz, and identifying whether the bandwidth frequency of the received signal is 12.5 kHz.

In FIG. 7, it is assumed that the synchronization is realized in the first path, i.e., the first adaptive bandwidth identification process unit 7020 outputs the synchronized signal flow, and the other path is automatically disconnected (the dotted line denotes disconnected path). Therefore, it is known that the bandwidth of the received signal is 6.25 kHz. On this ground, the decoding unit 7024 and the D/A conversion unit 7026 can perform corresponding decoding and D/A conversion on the synchronized signal flow, for restoring the source signal corresponding to the received signal. Here, the decoding and D/A conversion are only examples, but not to limit the present invention. After the bandwidth frequency of the received signal is identified, other processes can be performed as necessary.

Further, in practical application, the signal received via the antenna can be an intermediate signal or a radio frequency signal, thus before the process of the intermediate frequency digitization process module 701, it is necessary to perform radio frequency process or intermediate frequency process. Therefore, the system for adaptively identifying a signal bandwidth shown in FIG. 7 further includes an intermediate frequency process unit that is communicatively connected with the base-band process unit, and a radio frequency process unit that is communicatively connected with the intermediate frequency process unit. Here, the preferred circuit structures for the radio frequency process unit and the intermediate frequency process unit are shown in FIG. 5. Of course, circuit structures using other process manner or order can also be used, and the present invention is not limited thereto.

The signal bandwidth identification module 702 may further include a second signal bandwidth identification module (not shown) for performing serial identification of the signal bandwidth. The second signal bandwidth identification module is adapted for identifying the signal bandwidth of the I/Q signal according to the at least two signal identification templates sequentially, directly outputting a synchronized signal flow after a successful identification, or keeping on identifying the signal bandwidth of the I/Q signal according to the next signal identification template after an unsuccessful identification.

Figure 8:
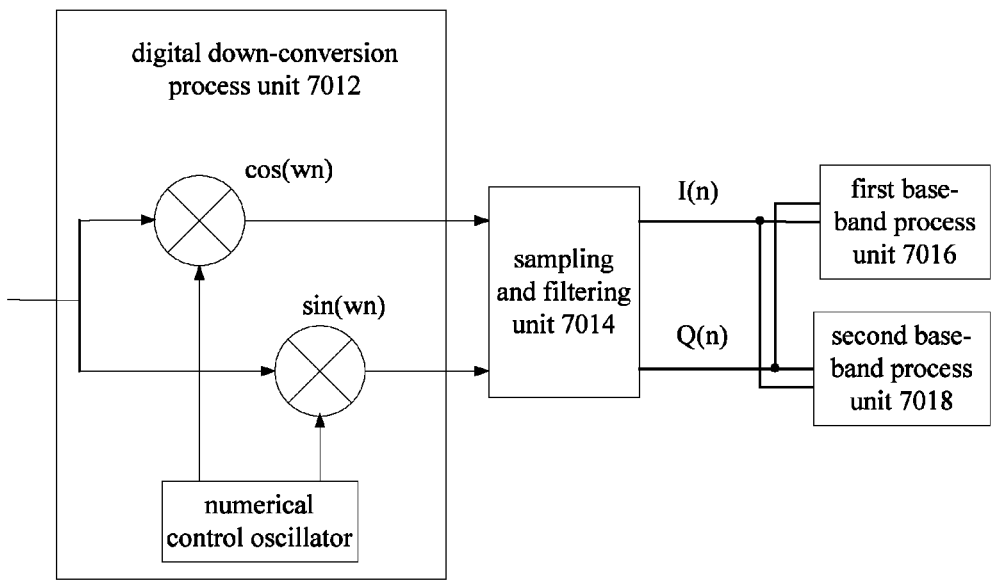
FIG. 8 is a circuit diagram of a digital down-conversion process unit according to an embodiment of the present invention.

The A/D conversion unit 7010 can be implemented as an A/D converter. The digital down-conversion process unit 7012 is implemented by the circuit shown in FIG. 8. The numerical controlled oscillator (NCO) performs a process that is a superposition of sine process and cosine process on the signal output from the ADC converter and outputs the intermediate frequency signal (such as the zero intermediate frequency signal). The sampling and filtering unit 7014 performs filtering on the zero intermediate frequency signal, and outputs the orthogonal I/Q signal. The I/Q signal is divided in to two paths for being respectively transmitted to the first base-band process unit 7016 and the second base-band process unit 7018. With the digital down-conversion, the problems in the analog down-conversion, such as non-linearity of the mixer, the frequency stability, sideband, phase noise, temperature drift, conversion speed of the analog local oscillator, or the like, are overcome, and the frequency stepping and the frequency interval also have ideal characteristics.

Figure 9:
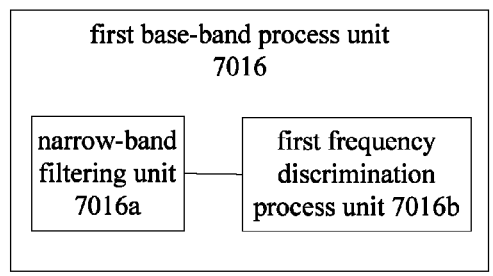
FIGS. 9 and 10 are schematic structural diagrams of a first base-band process unit and a second base-band process unit shown in FIG. 7.
Figure 10:
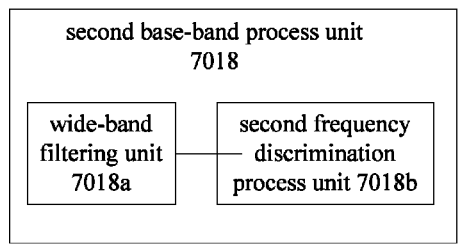

As shown in FIGS. 9 and 10, the first base-band process unit 7016 includes a first bandwidth filtering unit 7016a and a first frequency discrimination process unit 7016b. The second base-band process unit 7018 includes a second bandwidth filtering unit 7018a and a second frequency discrimination process unit 7018b. The first bandwidth filtering unit 7016a can be implemented by the narrow-band filter, which ensures that the signal with the bandwidth of 6.25 kHz can pass through in this embodiment. The second bandwidth filtering unit 7018a can be implemented by the wide-band filter, which ensures that the signal with the bandwidth of 12.5 kHz can pass through in this embodiment. Preferably, the first bandwidth filtering unit 7016a and the second bandwidth filtering unit 7018a are implemented by the FIR digital filter. Here, the narrow-band filtering process is 6.25 kHz bandwidth filtering process, and the wide-band filtering process is the 12.5 kHz bandwidth filtering process.

In the system for adaptively identifying a signal bandwidth of the present invention, the preferred parameters are as follows.
1) ADC sampling rate≥8fIF;
2) Data rate of the sampling filter: 20 kPSP for wide band, and 10 kPSP for narrow band;
3) Suppression level ≥70 dB in the transition band of 1.5 k, for ensuring that the adjacent channels selectivity index meets "12.5 k ACS≥60 dB for wide band, and 6.25 k ACS≥50 dB for narrow band"; and
4) FIR digital filter has high suppression level, so that the noise can be well suppressed, the performance of the filtering is improved, the adjacent channels selectivity index is improved, and the load of the ceramic filter is reduced; the digital filter has low rectangle coefficient, sharp transition band, and good filtering effect; the digital filter can filter the out-of-band noise, and improve the adjacent channels selectivity index.

Figure 11:
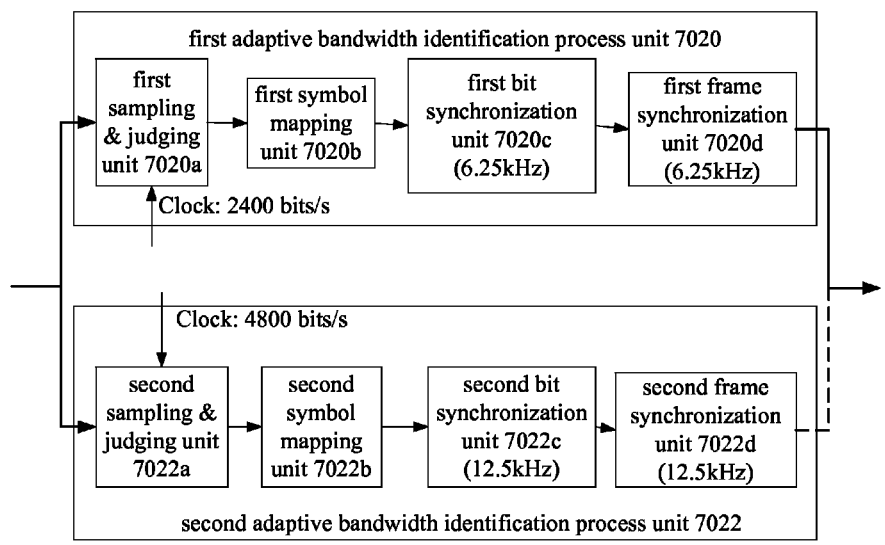
FIG. 11 is a schematic module diagram of a first adaptive bandwidth identification process unit and a second adaptive bandwidth identification process unit shown in FIG. 7.

FIG. 11 is a schematic module diagram of the first adaptive bandwidth identification process unit 7020 and the second adaptive bandwidth identification process unit 7022 as shown in FIG. 7.

The first adaptive bandwidth identification process unit 7020 includes a first sampling and judging unit 7020a, a first symbol mapping unit 7020b, a first bit synchronization unit 7020c, and a first frame synchronization unit 7020d; the sampling, judging and code symbol forming processes are performed on the first path of base-band signal by the first sampling and judging unit 7020a at the clock frequency which is for example but not limited to an integral multiple of 2400 bit/s, the result symbol value is processed by the first symbol mapping unit 7020b to output the corresponding bit flow, then the first bit synchronization process and the first frame synchronization process are performed on the bit flow sequentially by the first bit synchronization unit 7020c and the first frame synchronization unit 7020d, and then it is identified whether the bandwidth frequency of the received signal is 6.25 kHz according to the bit synchronization information and the frame synchronization information corresponding to the bandwidth frequency of 6.25 kHz.

The second adaptive bandwidth identification process unit 7022 includes a second sampling and judging unit 7022a, a second symbol mapping unit 7022b, a second bit synchronization unit 7022c, and a second frame synchronization unit 7022d; the sampling, judging and code symbol forming processes are performed on the second path of base-band signal by the second sampling and judging unit 7022a at a clock frequency which is for example but not limited to an integral multiple of 4800 bit/s, the result symbol value is processed by the second symbol mapping unit 7022b to output the corresponding bit flow, then the second bit synchronization process and the second frame synchronization process are performed on the bit flow sequentially by the second bit synchronization unit 7022c and the second frame synchronization unit 7022d, and then it is identified whether the bandwidth frequency of the received signal is 12.5 kHz according to the bit synchronization information and the frame synchronization information corresponding to the bandwidth frequency of 12.5 kHz.

For the sampling and judging process, by taking 4FSK demodulation as an example, three thresholds are set: th+, th0 and th−. Sampling and judging process is performed on the base-band signal at the Nyquist point, and at the Nyquist point, if the level is higher than th+, then the symbol is determined as +3; if the level is higher than th0 and lower than th+, then the symbol is determined as +1; if the level is higher than th− and lower than th0, then the symbol is determined as −1; and if the level is higher than th−, then the symbol is determined as −3.

Because multi-ary transmission is generally utilized, the mapping process must be performed after the judging. The symbol value +3 is mapped into "$01_2$"; the symbol value +1 is mapped into "$00_2$"; the symbol value −1 is mapped into "$10_2$"; the symbol value −3 is mapped into "$11_2$".

In the bit synchronization process, the specific start position of the data information is determined. For example, but not limited to, determination is performed on the bit flow of "0101111101011111".

In the frame synchronization process, according to a frame synchronization format defined by a protocol stack, it is judged whether the information flow follows the content of the protocol. After the synchronization, it can be determined as a 6.25 kHz FDMA signal or a 12.5 kHz FDMA signal.

Figure 12:
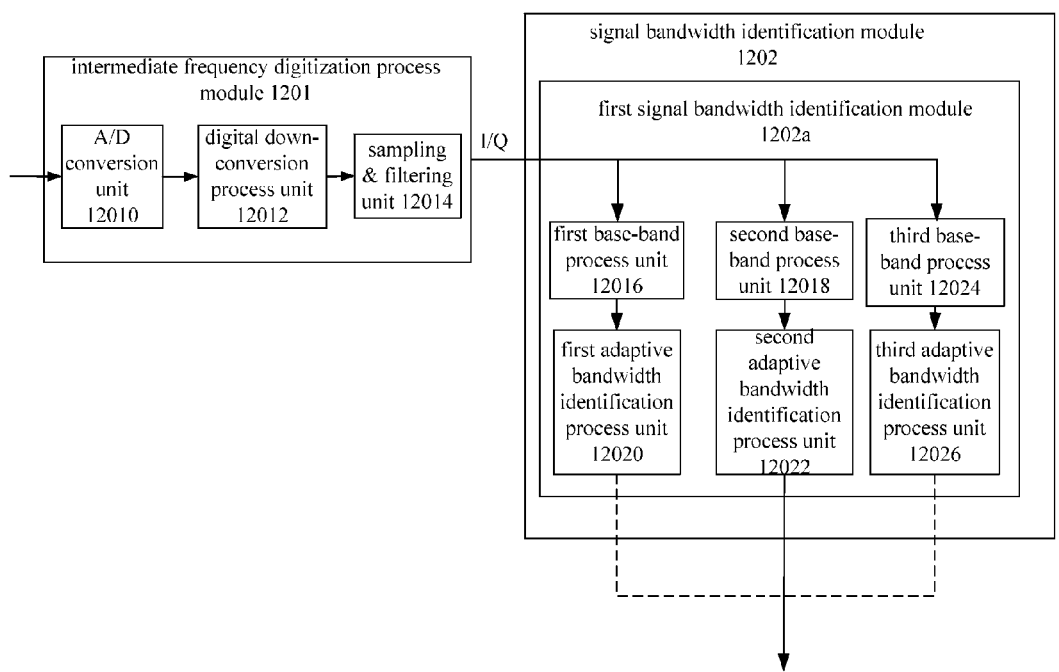
FIG. 12 is a schematic structural diagram of a system for adaptively identifying a signal bandwidth in which the identification is performed in parallel by using three signal templates.

FIG. 12 is a schematic structural diagram of a system for adaptively identifying a signal bandwidth in which the identification is performed in parallel by using three signal identification templates. As shown in FIG. 12, the system for adaptively identifying a signal bandwidth includes an intermediate frequency digitization process module 1201 and a signal bandwidth identification module 1202.

The three signal identification templates are respectively referred to as the first signal identification template, the second signal identification template and the third signal identification template. The first signal identification template includes a first base-band process and a first adaptive bandwidth identification process; the second signal identification template includes a second base-band process and a second adaptive bandwidth identification process; and the third signal identification template includes a third base-band process and a third adaptive bandwidth identification process. The signal bandwidth that can be processed by the first signal identification template is for example but not limited to 6.25 kHz, the signal bandwidth that can be processed by the second signal identification template is for example but not limited to 12.5 kHz, and the signal bandwidth that can be processed by the third signal identification template is for example but not limited to 25 kHz. The first base-band process includes the first bandwidth filtering process and the first frequency discrimination process, the second base-band process includes the second bandwidth filtering process and the second frequency discrimination process, and the third base-band process includes the third bandwidth filtering process and the third frequency discrimination process. Here, the first bandwidth filtering process is the 6.25 kHz bandwidth filtering, the second bandwidth filtering process is the 12.5 kHz bandwidth filtering, and the third bandwidth filtering process is the 25 kHz bandwidth filtering. The frequencies to which the first bandwidth filtering process, the second bandwidth filtering process and the third bandwidth filtering process correspond are consistent with those the signal identification templates corresponding to.

The intermediate frequency digitization process module 1201 is similar to the intermediate frequency digitization process module 701 shown in FIG. 7. The intermediate frequency digitization process module 1201 includes an A/D conversion unit 12010, a digital down-conversion process unit 12012, and a sampling and filtering unit 12014. The signal bandwidth identification module 1202 includes a first signal bandwidth identification module 1202a, and the first signal bandwidth identification module 1202a includes a first base-band process unit 12016, a second base-band process unit 12018, a first adaptive bandwidth identification process unit 12020, a second adaptive bandwidth identification process unit 12022, a third base-band process unit 12024 and a third adaptive bandwidth identification process unit 12026.

Similar to the intermediate frequency digitization process module 701 shown in FIG. 7, the intermediate frequency digitization process module 1201 is adapted for performing A/D conversion and digital down-conversion on the received signal, and outputting an I/Q signal by sampling and filtering the output intermediate frequency signal (such as the zero intermediate frequency signal). The I/Q signal is divided into two paths to be sent to the first base-band process unit 12016, the second base-band process unit 12018 and the third base-band process unit 12024 for the first base-band process, the second base-band process and the third base-band process. The first base-band process unit 12016 performs the first base-band process on a path of the I/Q signal, to which the first base-band process unit 12016 corresponds, according to the first signal identification template, the first adaptive bandwidth identification process unit 12020 performs the first adaptive bandwidth identification process on the path of the I/Q signal, to which the first adaptive bandwidth identification process unit 12020 corresponds, according to the first signal identification template, for identifying the signal bandwidth of the I/Q signal; meanwhile, the second base-band process unit 12018 performs the second base-band process on another path of the I/Q signal, to which the second base-band process unit 12018 corresponds, according to the second signal identification template, the second adaptive bandwidth identification process unit 12022 performs the second adaptive bandwidth identification process on the another path of I/Q signal, to which the second adaptive bandwidth identification process unit 12022 corresponds, according to the second signal identification template, for identifying the signal bandwidth of the I/Q signal; and meanwhile, the third base-band process unit 12024 performs the third base-band process on yet another path of the I/Q signal, to which the third base-band process unit 12024 corresponds, according to the third signal identification template, the third adaptive bandwidth identification process unit 12026 performs the third adaptive bandwidth identification process on the yet another path of I/Q signal, to which the third adaptive bandwidth identification process unit 12026 corresponds, according to the third signal identification template, for identifying the signal bandwidth of the I/Q signal.

The first adaptive bandwidth identification process unit 12020 is adapted for performing sampling, judging and code symbol forming processes on the signal output by the first base-band process unit 12016, performing a first symbol mapping process on the output symbol value for outputting a corresponding bit flow, performing a first frame synchronization process on the bit flow by using frame synchronization information corresponding to the bandwidth frequency of 6.25 kHz, and identifying whether the bandwidth frequency of the received signal is 6.25 kHz.

The second adaptive bandwidth identification process unit 12022 is adapted for performing sampling, judging and code symbol forming processes on the signal output by the second base-band process unit 12018, performing a second symbol mapping process on the output symbol value for outputting a corresponding bit flow, performing a second frame synchronization process on the bit flow by using frame synchronization information corresponding to the bandwidth frequency of 12.5 kHz, and identifying whether the bandwidth frequency of the received signal is 12.5 kHz.

The third adaptive bandwidth identification process unit 12026 is adapted for performing sampling, judging and code symbol forming processes on the signal output by the third base-band process unit 12024, performing a third symbol mapping process on the output symbol value for outputting a corresponding bit flow, performing a third frame synchronization process on the bit flow by using frame synchronization information corresponding to the bandwidth frequency of 25 kHz, and identifying whether the bandwidth frequency of the received signal is 25 kHz.

In the embodiment shown in FIG. 12, it is assumed that the synchronization is realized in the second path, i.e., the second adaptive bandwidth identification process unit 12022 outputs the synchronized signal flow, and the other two paths are automatically disconnected (the dotted line denotes disconnected path). Therefore, it is known that the bandwidth of the received signal is 12.5 kHz. On this ground, further processes such as decoding and digital to analog conversion can be performed on the received signal.

The signal bandwidth identification module 1202 may further include a second signal bandwidth identification module (not shown) for performing serial identification of the signal bandwidth. The second signal bandwidth identification module is adapted for identifying the signal bandwidth of the I/Q signal according to at least two signal identification templates sequentially, outputting a synchronized signal flow after a successful identification, or keeping on identifying the signal bandwidth of the I/Q signal according to next signal identification template after a unsuccessful identification.

It is to be noted that the above detailed description of the system for adaptively identifying a signal bandwidth is also applicable to the method for adaptively identifying a signal bandwidth; and similarly, the detailed description of the method for adaptively identifying a signal bandwidth is also applicable to the system for adaptively identifying a signal bandwidth, which will not be described in detail herein.

The above are only preferred embodiments of the present invention, but not meant to limit the present invention. Any modifications, equivalents and improvements made within the spirit and principle of the present invention fall in the scope of the protection of the present invention.

What is claimed is:

1. A method for adaptively identifying a signal bandwidth in a communication network, comprising:
   performing, by an intermediate frequency digitization process module, an intermediate frequency digitization process on a received signal and outputting an in-phase/quadrature signal; and
   identifying, by a signal bandwidth identification module, the signal bandwidth of the in phase/quadrature signal according to at least two signal identification templates and outputting a synchronized signal flow after a successful identification.

2. The method according to claim 1, wherein the step of identifying, by the signal bandwidth identification module, the signal bandwidth of the in-phase/quadrature signal according to at least two signal identification templates and outputting a synchronized signal flow after a successful identification comprises:
   dividing the in-phase/quadrature signal into at least two paths in parallel, using each of the at least two signal identification templates to identify the signal bandwidth of each path to which each of the signal identification templates corresponds, and outputting the synchronized signal flow after a successful identification.

3. The method according to claim 2, wherein the at least two signal identification templates comprises a first signal identification template and a second signal identification template;
   the first signal identification template comprises a first base-band process and a first adaptive bandwidth identification process; and the second signal identification template comprises a second base-band process and a second adaptive bandwidth identification process;
   the first base-band process and the first adaptive bandwidth identification process are performed on one path of the in-phase/quadrature signal, to which the first signal identification template corresponds, according to the first signal identification template, for identifying the signal bandwidth of the path of the in-phase/quadrature signal; and the second base-band process and the second adaptive bandwidth identification process are performed on the other path of the in-phase/quadrature signal, to which the second signal identification template corresponds, according to the second signal identification template, for identifying the signal bandwidth of the other path of the in-phase/quadrature signal.

4. The method according to claim 3, wherein:
   the first adaptive bandwidth identification process comprises: performing sampling, judging and code symbol forming processes on the signal output by the first base-band process, performing a first symbol mapping process on the resultant symbol value for outputting a corresponding bit flow, then performing a first frame synchronization process on the bit flow by using frame synchronization information corresponding to a bandwidth frequency of 6.25 kHz, and identifying whether the bandwidth frequency of the received signal is 6.25 kHz; and
   the second adaptive bandwidth identification process comprises: performing sampling, judging and code symbol forming processes on the signal output by the second base-band process to output a symbol value, performing a second symbol mapping process on the resultant symbol value for outputting a corresponding bit flow, then performing a second frame synchronization process on the bit flow by using frame synchronization information corresponding to a bandwidth frequency of 12.5 kHz, and identifying whether the bandwidth frequency of the received signal is 12.5 kHz.

5. The method according to claim 1, wherein the step of identifying, by the signal bandwidth identification module, the signal bandwidth of the in-phase/quadrature signal according to at least two signal identification templates and outputting a synchronized signal flow after a successful identification comprises:
   identifying, by the signal bandwidth identification module, the signal bandwidth of the in-phase/quadrature signal according to the at least two signal identification templates sequentially, directly outputting the synchronized signal flow after a successful identification, or keeping on identifying the signal bandwidth of the in-phase/quadrature signal according to next signal identification template after an unsuccessful identification.

6. A system for adaptively identifying a signal bandwidth, comprising:
   an intermediate frequency digitization process module adapted for performing an intermediate frequency digitization process on a received signal and outputting an in-phase/quadrature signal; and
   a signal bandwidth identification module adapted for identifying the signal bandwidth of the in-phase/quadrature signal output by the intermediate frequency digitization process module according to at least two signal identification templates and outputting a synchronized signal flow after a successful identification.

7. The system for adaptively identifying the signal bandwidth according to claim 6, wherein the signal bandwidth identification module comprises:
a first signal bandwidth identification module adapted for dividing the in-phase/quadrature signal into at least two paths in parallel, using each of the at least two signal identification templates to identify the signal bandwidth of each path to which each of the signal identification templates corresponds, and outputting the synchronized signal flow after a successful identification.

8. The system for adaptively identifying the signal bandwidth according to claim 7, wherein:
the at least two signal identification templates comprises a first signal identification template and a second signal identification template;
the first signal identification template comprises a first base-band process and a first adaptive bandwidth identification process; and the second signal identification template comprises a second base-band process and a second adaptive bandwidth identification process;
the first signal bandwidth identification module comprises a first base-band process unit, a second base-band process unit, a first adaptive bandwidth identification process unit and a second adaptive bandwidth identification process unit;
the first base-band process unit is adapted for performing the first base-band process on one path of the in-phase/quadrature signal, to which the first base-band process unit corresponds, according to the first signal identification template, the first adaptive bandwidth identification process unit is adapted for performing the first adaptive bandwidth identification process on the path of the in-phase/quadrature signal, to which the first adaptive bandwidth identification process unit corresponds, according to the first signal identification template, for identifying the signal bandwidth of the in-phase/quadrature signal; and
the second base-band process unit is adapted for performing the second base-band process on the other path of the in-phase/quadrature signal, to which the second base-band process unit corresponds, according to the second signal identification template, the second adaptive bandwidth identification process unit is adapted for performing the second adaptive bandwidth identification process on the other path of the in-phase/quadrature signal, to which the second adaptive bandwidth identification process unit corresponds, according to the second signal identification template, for identifying the signal bandwidth of the in-phase/quadrature signal.

9. The system for adaptively identifying the signal bandwidth according to claim 8, wherein:
the first adaptive bandwidth identification process unit is adapted for performing sampling, judging and code symbol forming processes on the signal output by the first base-band process unit, performing a first symbol mapping process on the resultant symbol value for outputting a corresponding bit flow, then performing a first frame synchronization process on the bit flow by using frame synchronization information corresponding to a bandwidth frequency of 6.25 kHz, and identifying whether the bandwidth frequency of the received signal is 6.25 kHz; and
the second adaptive bandwidth identification process unit is adapted for performing sampling, judging and code symbol forming processes on the signal output by the second base-band process unit, performing a second symbol mapping process on the resultant symbol value for outputting a corresponding bit flow, then performing a second frame synchronization process on the bit flow by using frame synchronization information corresponding to a bandwidth frequency of 12.5 kHz, and identifying whether the bandwidth frequency of the received signal is 12.5 kHz.

10. The system for adaptively identifying the signal bandwidth according to claim 6, wherein the signal bandwidth identification module comprises:
a second signal bandwidth identification module adapted for identifying the signal bandwidth of the in-phase/quadrature signal according to the at least two signal identification templates sequentially, directly outputting a synchronized signal flow after a successful identification, or keeping on identifying the signal bandwidth of the in-phase/quadrature signal according to next signal identification template after an unsuccessful identification.

* * * * *